(No Model.)
H. W. DOUGHTEN.
FURROWER AND COVERER.
No. 484,581.  Patented Oct. 18, 1892.
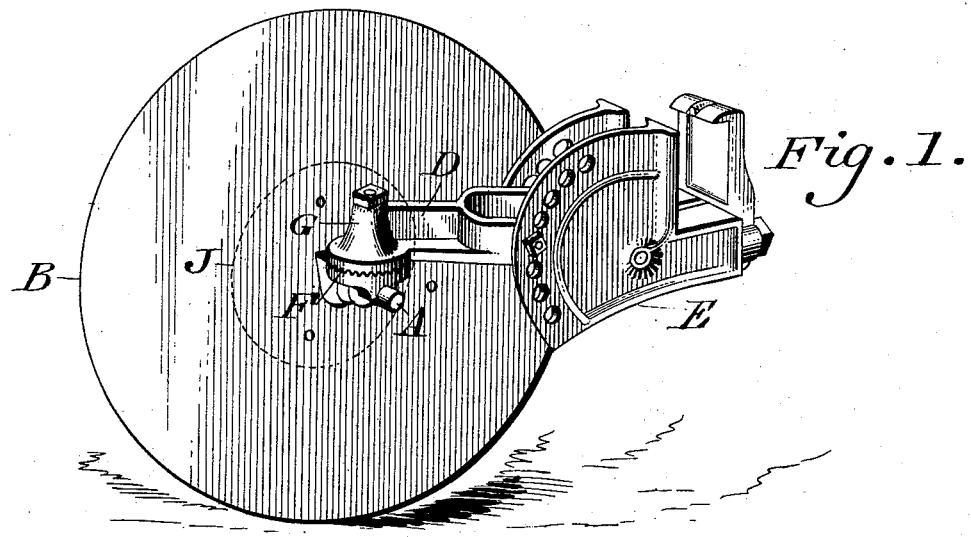
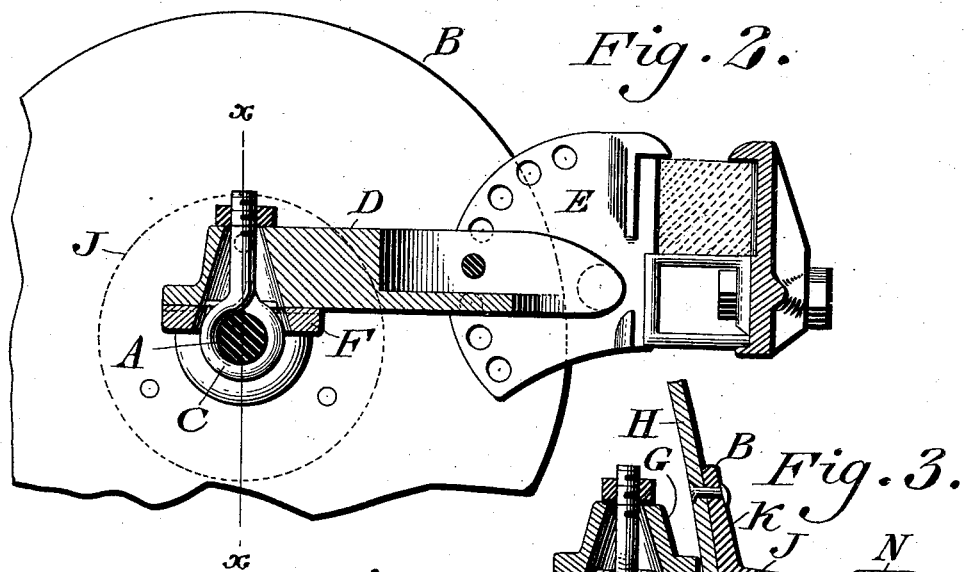
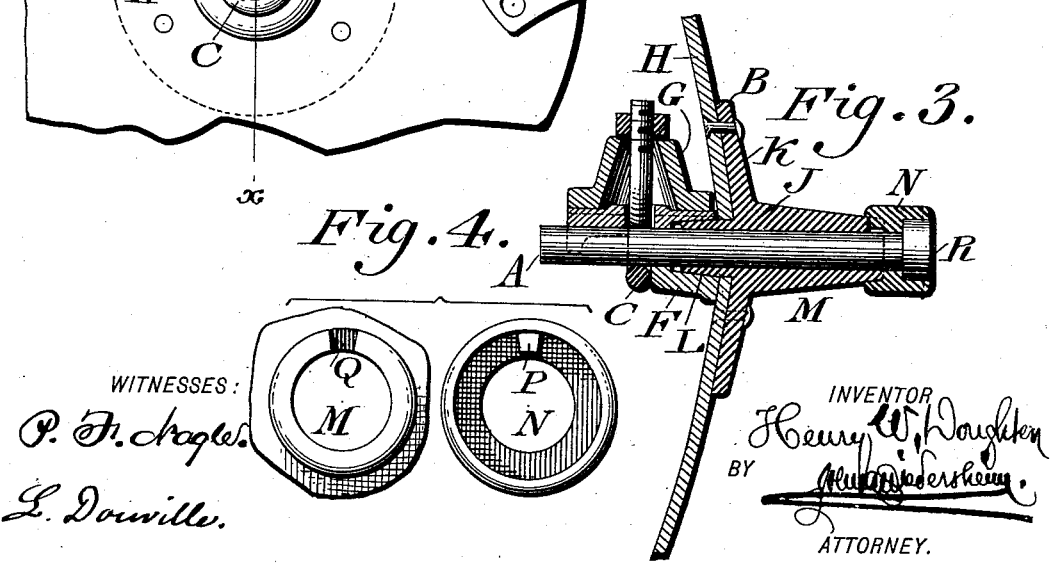
WITNESSES:
P. H. Naglee
L. Douville.
INVENTOR
Henry W. Doughten
BY
[signature]
ATTORNEY.

UNITED STATES PATENT OFFICE.

HENRY W. DOUGHTEN, OF MOORESTOWN, NEW JERSEY.

FURROWER AND COVERER.

SPECIFICATION forming part of Letters Patent No. 484,581, dated October 18, 1892.

Application filed May 24, 1892. Serial No. 434,148. (No model.)

*To all whom it may concern:*

Be it known that I, HENRY W. DOUGHTEN, a citizen of the United States, residing at Moorestown, county of Burlington, and State of New Jersey, have invented a new and useful Improvement in Furrowers and Coverers, which improvement is fully set forth in the following specification and accompanying drawings.

My invention relates to improvements in furrowers and coverers where the rotary share is mainly formed of a disk of steel and the hub and adjacent portions are formed of cast-iron, the invention consisting in the construction and combination of parts, as hereinafter set forth.

Figure 1 represents a perspective view of the portion of a furrower and coverer embodying my invention. Fig. 2 represents a partial side elevation and partial vertical section thereof on an enlarged scale. Fig. 3 represents a section of a portion on line $xx$, Fig. 2. Fig. 4 represents a view of detached portions.

Similar letters of reference indicate corresponding parts in the several figures.

Referring to the drawings, A designates an axle which carries the rotary share B and is secured by the eyebolt C to the arm D, which is adjustably connected with the bracket E, the latter being adapted to be connected with one of the beams of the device, which features, broadly considered, are not new.

F designates the sand or dust guard, whose upper face is serrated and engages with the serrated lower face of the conical portion G of the arm D, whereby when the share is angularly adjusted slipping of said parts F and G is prevented.

The share B consists of the concave disk H, of steel, and hub J, of cast-iron. Formed with the hub are the flanges K and sleeves L M, the sleeves being on opposite sides of the flange, thus forming a long bearing for the share B on the axle A. On the outer end of the flange M is a cap N, which is formed with a tooth P, entering a recess Q in the sleeve M, the head R of the axle A entering said cap, whereby the share is nicely retained in position. The sleeve passes through the central opening in the disk H of the share and enters the guard F, thus preventing sand, dirt, &c., reaching the axle. The flange K rests against the back of the disk H and is riveted or otherwise secured thereto, the several parts just described being most plainly illustrated in Fig. 3. It will be seen that the flange K sustains the disk H at the back thereof and braces the same, whereby it is vastly strengthened. Furthermore, as said disk is constructed of steel its durability is increased, and when the same is worn out it may be disconnected from the flange K and replaced by a new part, while the hub portion, consisting of the flange and the sleeves L M, remains intact and may render further service instead of being lost, as is occasioned in articles of the class as heretofore existing.

Having thus described my invention, what I claim as new, and desire to secure by Letters Patent, is—

1. An axle with a bearing, an arm sustaining said bearing, a dust-guard on said bearing, a hub with a peripheral flange and sleeves on opposite sides of the same, and a rotary share secured to said flange, one of said sleeves entering a recess in said dust-guard, said parts being combined substantially as described.

2. An axle with a head, a rotary share whose hub is on said axle and provided with a sleeve having a recess, and a cap with a tooth fitting in said recess, the head of said axle fitting in a recess in said cap, said parts being combined substantially as described.

HENRY W. DOUGHTEN.

Witnesses:
J. T. SIPPLE,
N. L. ROBERTS.